United States Patent [19]
Hogge et al.

[11] Patent Number: 5,802,709
[45] Date of Patent: Sep. 8, 1998

[54] METHOD FOR MANUFACTURING SURFACE MOUNT CONDUCTIVE POLYMER DEVICES

[75] Inventors: Steven Darryl Hogge, Corona, Calif.; Mengruo Zhang, Taikoo Shing, Hong Kong; Gary Straker, Riverside, Calif.; Paul G. Gratzinger, Moreno Valley, Calif.; Duane Wisner, Riverside, Calif.

[73] Assignee: Bourns, Multifuse (Hong Kong), Ltd., Kowloon Bay, Hong Kong

[21] Appl. No.: 838,210

[22] Filed: Apr. 16, 1997

Related U.S. Application Data

[63] Continuation of Ser. No. 559,327, Nov. 16, 1995, abandoned, which is a continuation-in-part of Ser. No. 515,506, Aug. 15, 1995, abandoned.

[51] Int. Cl.$^6$ .................................................. H01R 43/00
[52] U.S. Cl. ........................... 29/827; 156/324; 174/52.4; 338/324
[58] Field of Search .............................. 29/827; 156/324; 174/55.4; 338/324

[56] References Cited

U.S. PATENT DOCUMENTS

| | | | |
|---|---|---|---|
| 2,861,163 | 11/1958 | Asakawa | 201/72 |
| 2,978,665 | 4/1961 | Vernet et al. | 338/223 |
| 3,061,501 | 10/1962 | Dittman et al. | 156/250 |
| 3,138,686 | 6/1964 | Mitoff et al. | 200/142 |
| 3,187,164 | 6/1965 | Andrich | 219/504 |
| 3,243,753 | 3/1966 | Kohler | 338/31 |
| 3,351,882 | 11/1967 | Kohler et al. | 338/322 |
| 3,535,494 | 10/1970 | Armbruster | 219/518 |
| 3,571,777 | 3/1971 | Tully et al. | 338/20 |

(List continued on next page.)

FOREIGN PATENT DOCUMENTS

| | | |
|---|---|---|
| 0158410 | 10/1985 | European Pat. Off. . |
| 0311142 | 12/1989 | European Pat. Off. ......... H01C 1/14 |
| 2838508 | 3/1980 | Germany . |
| 62/240526 | 10/1987 | Japan .............................. 156/244.27 |
| 64-47534 | 2/1989 | Japan .............................. 156/244.27 |
| 1167551 | 10/1969 | United Kingdom . |
| 1172718 | 12/1969 | United Kingdom . |
| 1458720 | 12/1976 | United Kingdom . |
| 1561355 | 2/1980 | United Kingdom . |
| 1604735 | 12/1981 | United Kingdom . |

OTHER PUBLICATIONS

Japanese Patent Application No. 49–82736, Aug. 9, 1974.
Saburi, O. "Proscessing Techniques and Applications of Positive Temperature Coefficient Thermistors", *IEEE Transactions on Component Parts*, pp. 53–67 (1963).
Meyer, J. "Glass Transition Temperature as a Guide to Selection of Polymers Suitable for PTC Material", *Polymer Engineering And Science*, 13/6:462–468 (Nov., 1973).
Meyer, J. (1974) "Stability of polymer composites as positive–temperature–coefficient resistors" *Polymer Engineering and Science*, 14/10:706–716.
Arrowsmith, D. J. (1970) "Adhesion of Electroformed Copper and Nickel to Plastic Laminates", *Transactions of the Instituted of Metal Finishing*, vol. 48, pp. 88–92.
Bigg D. M. et al. "Conductive Polymeric Composites from Short Conductive Fibers", Batelle Columbus Laboratories, pp. 23–38.

*Primary Examiner*—Carl J. Arbes
*Attorney, Agent, or Firm*—Klein & Szekeres, LLP

[57] ABSTRACT

A conductive polymer device includes an active element comprising a conductive polymeric layer laminated between a pair of electrodes to which terminal leads are attached. The active element is enclosed in an insulative package. Each of the electrodes may be formed integrally with its associated terminal lead in a single lead frame, with a layer of conductive polymeric material laminated between two such lead frames. Alternatively, a conductive polymeric layer may be laminated between two electrodes, with a terminal lead then being soldered to each electrode. The insulative package for the active element may be either an over-molded housing encasing the active element, or a pre-molded housing having a cavity into which the active element is installed, and which is then hermetically sealed with a suitable sealant material.

15 Claims, 5 Drawing Sheets

U.S. PATENT DOCUMENTS

| | | | |
|---|---|---|---|
| 3,619,560 | 11/1971 | Buiting et al. | 219/300 |
| 3,654,533 | 4/1972 | della Porta et al. | 317/258 |
| 3,673,121 | 6/1972 | Meyer | 252/511 |
| 3,689,736 | 9/1972 | Meyer | 219/222 |
| 3,745,507 | 7/1973 | Ishida et al. | 338/25 |
| 3,760,495 | 9/1973 | Meyer | 29/610 |
| 3,823,217 | 7/1974 | Kampe | 264/105 |
| 3,824,328 | 7/1974 | Ting et al. | 174/52.2 |
| 3,858,144 | 12/1974 | Bedard et al. | 338/22 R |
| 3,861,029 | 1/1975 | Smith-Johannsen et al. | 29/611 |
| 3,914,363 | 10/1975 | Bedard et al. | 264/105 |
| 3,976,600 | 8/1976 | Meyr | 252/511 |
| 4,101,862 | 7/1978 | Takagi et al. | 338/23 |
| 4,151,126 | 4/1979 | Adelman et al. | 252/508 |
| 4,151,401 | 4/1979 | Van Bokestal et al. | 219/508 |
| 4,177,376 | 12/1979 | Horsma et al. | 219/553 |
| 4,177,446 | 12/1979 | Diaz | 338/212 |
| 4,237,441 | 12/1980 | van Konynenberg et al. | 338/22 R |
| 4,238,812 | 12/1980 | Middleman et al. | 361/106 |
| 4,246,468 | 1/1981 | Horsma | 219/553 |
| 4,250,398 | 2/1981 | Ellis et al. | 219/345 |
| 4,255,698 | 3/1981 | Simon | 320/35 |
| 4,272,471 | 6/1981 | Walker | 264/104 |
| 4,313,996 | 2/1982 | Newman et al. | 156/244.27 |
| 4,314,230 | 2/1982 | Cardinal et al. | 338/314 |
| 4,314,231 | 2/1982 | Walty | 338/328 |
| 4,315,237 | 2/1982 | Middleman et al. | 338/22 R |
| 4,317,027 | 2/1982 | Middleman et al. | 219/553 |
| 4,327,351 | 4/1982 | Walker | 338/22 R |
| 4,329,726 | 5/1982 | Middleman et al. | 361/58 |
| 4,341,949 | 7/1982 | Steiner et al. | 219/553 |
| 4,348,584 | 9/1982 | Gale et al. | 219/514 |
| 4,352,083 | 9/1982 | Middleman et al. | 338/23 |
| 4,388,607 | 6/1983 | Toy et al. | 338/22 |
| 4,413,301 | 11/1983 | Middleman et al. | 361/106 |
| 4,426,339 | 1/1984 | Kamath et al. | 264/22 |
| 4,426,633 | 1/1984 | Taylor | 338/25 |
| 4,439,918 | 4/1984 | Carroll, II et al. | 29/840 |
| 4,444,708 | 4/1984 | Gale et al. | 264/105 |
| 4,445,026 | 4/1984 | Walker | 219/553 |
| 4,457,138 | 7/1984 | Middleman et al. | 361/58 |
| 4,481,498 | 11/1984 | McTavish et al. | 338/20 |
| 4,490,218 | 12/1984 | Kadija et al. | 204/13 |
| 4,521,265 | 6/1985 | Kunihiko et al. | 156/324 |
| 4,534,889 | 8/1985 | van Konynenburg et al. | 252/511 |
| 4,542,365 | 9/1985 | McTavish et al. | 338/20 |
| 4,545,926 | 10/1985 | Fouts, Jr. et al. | 252/511 |
| 4,560,498 | 12/1985 | Horsma et al. | 252/511 |
| 4,639,818 | 1/1987 | Cherian | 361/106 |
| 4,647,894 | 3/1987 | Ratell | 338/33 R |
| 4,647,896 | 3/1987 | Ratell | 338/22 R |
| 4,652,325 | 3/1987 | Benge | 156/244.11 |
| 4,654,511 | 3/1987 | Horsma et al. | 219/548 |
| 4,685,025 | 8/1987 | Carlomagno | 361/106 |
| 4,689,475 | 8/1987 | Kleiner et al. | 219/553 |
| 4,698,614 | 10/1987 | Welch et al. | 338/22 R |
| 4,732,701 | 3/1988 | Nishii et al. | 252/511 |
| 4,752,762 | 6/1988 | Inano et al. | 338/22 R |
| 4,755,246 | 7/1988 | Monio | 156/244.11 |
| 4,769,901 | 9/1988 | Nagahori | 29/621 |
| 4,774,024 | 9/1988 | Deep et al. | 252/511 |
| 4,787,135 | 11/1988 | Nagahori | 29/612 |
| 4,800,253 | 1/1989 | Kleiner et al. | 219/553 |
| 4,845,838 | 7/1989 | Jacobs et al. | 29/671 |
| 4,849,133 | 7/1989 | Yoshida et al. | 252/511 |
| 4,876,439 | 10/1989 | Nagahori | 219/541 |
| 4,882,466 | 11/1989 | Friel | 219/219 |
| 4,884,163 | 11/1989 | Deep et al. | 361/58 |
| 4,904,850 | 2/1990 | Claypool et al. | 219/548 |
| 4,907,340 | 3/1990 | Fang et al. | 29/610 |
| 4,924,074 | 5/1990 | Fang et al. | 219/548 |
| 4,942,286 | 7/1990 | Monter et al. | 219/219 |
| 4,951,382 | 8/1990 | Jacobs et al. | 29/611 |
| 4,951,384 | 8/1990 | Jacobs et al. | 29/611 |
| 4,954,696 | 9/1990 | Ishil et al. | 219/548 |
| 4,955,267 | 9/1990 | Jacobs et al. | 29/611 |
| 4,959,505 | 9/1990 | Ott | 174/52.2 |
| 4,967,176 | 10/1990 | Horsma et al. | 338/22 R |
| 4,980,541 | 12/1990 | Shafe et al. | 219/548 |
| 4,983,944 | 1/1991 | Uchida et al. | 338/22 R |
| 5,015,824 | 5/1991 | Monter et al. | 219/219 |
| 5,039,844 | 8/1991 | Nagahori | 219/541 |
| 5,049,850 | 9/1991 | Evans | 338/22 R |
| 5,057,674 | 10/1991 | Smith-Johannsen | 219/553 |
| 5,064,997 | 11/1991 | Fang et al. | 219/505 |
| 5,089,688 | 2/1992 | Fang et al. | 219/505 |
| 5,089,801 | 2/1992 | Chan et al. | 338/22 R |
| 5,140,297 | 8/1992 | Jacobs et al. | 338/22 R |
| 5,142,267 | 8/1992 | Fellner et al. | 338/23 |
| 5,148,005 | 9/1992 | Fang et al. | 219/505 |
| 5,164,133 | 11/1992 | Ishida et al. | 264/105 |
| 5,166,658 | 11/1992 | Fang et al. | 338/23 |
| 5,171,774 | 12/1992 | Ueno et al. | 524/495 |
| 5,173,362 | 12/1992 | Tekkanat et al. | 428/283 |
| 5,174,924 | 12/1992 | Yamada et al. | 252/511 |
| 5,178,797 | 1/1993 | Evans | 252/508 |
| 5,181,006 | 1/1993 | Shafe et al. | 338/22 R |
| 5,190,697 | 3/1993 | Ohkita et al. | 252/511 |
| 5,195,013 | 3/1993 | Jacobs et al. | 361/106 |
| 5,210,517 | 5/1993 | Abe | 338/22 R |
| 5,212,466 | 5/1993 | Yamada et al. | 338/22 R |
| 5,227,946 | 7/1993 | Jacobs et al. | 361/106 |
| 5,241,741 | 9/1993 | Sugaya | 29/612 |
| 5,247,277 | 9/1993 | Fang et al. | 338/22 R |
| 5,250,228 | 10/1993 | Baigrie et al. | 252/511 |
| 5,280,263 | 1/1994 | Sugaya | 338/22 R |
| 5,303,115 | 4/1994 | Nayar et al. | 361/106 |
| 5,351,026 | 9/1994 | Kanbara et al. | 338/22 R |
| 5,358,793 | 10/1994 | Hanada et al. | 428/560 |
| 5,401,154 | 3/1995 | Sargent | 425/114 |

METHOD FOR MANUFACTURING SURFACE MOUNT CONDUCTIVE POLYMER DEVICES

CROSS REFERENCE TO RELATED APPLICATION

This application is a divisional application of U.S. Ser. No. 08/559,327, filed Nov. 16, 1995, now abandoned, which is a Continuation-In-Part of application Ser. No. 08/515,506; filed Aug. 15, 1995, now abandoned.

BACKGROUND OF THE INVENTION

The present invention relates broadly to the field of conductive polymer devices, including methods for manufacturing such devices. More specifically, it relates to electronic devices comprising a conductive polymer layer laminated between a pair of conductive electrodes and packaged in an insulative housing, and to the method for manufacturing such devices.

Electronic devices that include an element made from a conductive polymer have become increasingly popular, being used in a variety of applications. They have achieved widespread usage, for example, in overcurrent protection and self-regulating heater applications, in which a polymeric material having a positive temperature coefficient of resistance is employed. Examples of positive temperature coefficient (PTC) polymeric materials, and of devices incorporating such materials, are disclosed in the following U.S. Pat. Nos.:

3,823,217—Kampe
4,237,441—van Konynenburg
4,238,812—Middleman et al.
4,317,027—Middleman et al.
4,329,726—Middleman et al.
4,413,301—Middleman et al.
4,426,633—Taylor
4,445,026—Walker
4,481,498—McTavish et al.
4,545,926—Fouts, Jr. et al.
4,639,818—Cherian
4,647,894—Ratell
4,647,896—Ratell
4,685,025—Carlomagno
4,774,024—Deep et al.
4,689,475—Kleiner et al.
4,732,701—Nishii et al.
4,769,901—Nagahori
4,787,135—Nagahori
4,800,253—Kleiner et al.
4,849,133—Yoshida et al.
4,876,439—Nagahori
4,884,163—Deep et al.
4,907,340—Fang et al.
4,951,382—Jacobs et al.
4,951,384—Jacobs et al.
4,955,267—Jacobs et al.
4,980,541—Shafe et al.
5,049,850—Evans
5,140,297—Jacobs et al.
5,171,774—Ueno et al.
5,174,924—Yamada et al.
5,178,797—Evans
5,181,006—Shafe et al.
5,190,697—Ohkita et al.
5,195,013—Jacobs et al.
5,227,946—Jacobs et al.
5,241,741—Sugaya
5,250,228—Baigrie et al.
5,280,263—Sugaya
5,358,793—Hanada et al.

The conductive polymer devices of the prior art are typically made in a batch process, in which a sheet of conductive polymer material is formed, and then laminated between sheets of conductive metal foil. The laminated assembly is then cut into individual electronic components. More specifically, the polymeric sheet is formed by batch mixing or compounding a polymer (e.g., high density polyethylene, or HDPE), a conductive filler such as carbon black or various metallic fillers, and other materials (e.g., other fillers and antioxidants), then forming a sheet of conductive polymer material, using either single screw extrusion or compression/injection molding.

Furthermore (as disclosed, for example, in U.S. Pat. No. 4,426,633—Taylor), the materials may be mixed, and, while heated, extruded through a pelletizing die and chopped to form pellets. The pellets are then vacuum-dried and extruded into a tape or sheet that is cut into pieces, each of which is laminated between a pair of foil sheets using a discrete, high temperature compression process, before finally being cut into the individual components.

It is of great importance, particularly in overcurrent protection applications, for the material to have a high degree of uniformity in such areas as volume resistivity, filler dispersion, process heat history, and degree of polymer cross-linking, in devices having the same nominal electrical performance specifications. A drawback to the batch processing of the prior art is that a relatively high degree of variability is introduced into the manufactured devices. This drawback stems from several sources.

First there is the inherent variability in the batch mixing or compounding step of the process. Specifically, there is an inherent variability, on a batch-to batch basis, of material mix, set-up conditions, and process conditions. Furthermore, there is often an insufficient mixing of the materials, and the batch mixing process requires a secondary melt processing (such as single screw extrusion) to form the material into a usable shape. Some compensation for the batch-to-batch variability may be obtained by mixing together multiple master batches prior to the secondary melt processing, but the result is still a degree of variability in resistance in the final sheet, introduced by the typical use of a single screw extruder in the secondary melt processing. This variability, which may include non-normal distributions exhibiting multi-modal resistance peaks, is typically caused by non-uniform mixing of the master batches and the introduction of additional heat history to the material during the secondary melt process in the extruder. The resulting degree of variability may be unacceptable for many applications.

In addition, the batch mixing step produces compounded pellets that need to be stored in an environment in which temperature, humidity, and dust content are tightly controlled, to minimize the presence of impurities and moisture that need to be removed to avoid bubbles in the foil-polymer interface of the laminated final product.

Variations in both physical dimensions and resistance characteristics are also introduced in the batch lamination step of the manufacturing process, as a result of different temperatures, pressures, and gap spacings among the multiple lamination machines, as well as stroke-to-stroke variations on any given single machine.

Furthermore, each of the above-described discrete processes contributes an additional and different heat history to the product, degrading the base polymeric resin due to thermal oxidation from exposure to temperatures above the melting point of the polymer. This can result in excessive variances in the electrical performance characteristics of the finished product.

The products made by the above-described processes, i.e., polymer PTC devices, are typically mounted on a circuit board for use in an electronic circuit. A particularly popular and advantageous packaging configuration for many types of board-mounted devices and components is that which is known as "surface mounting technology", or "SMT". SMT components are characterized by "J"-shaped or "gull wing" terminal leads, and by an outer casing configuration that facilitates automated component handling (e.g., vacuum-type "pick-and-place" robots and optical character recognition for component positioning and orientation). A significant advantage of SMT-type devices over so-called "through-hole" devices is that the former can readily be mounted on both side of a printed circuit board, while the latter cannot.

SMT-type polymer PTC components have been developed in the prior art, as shown, for example, in U.S. Pat. No. 5,241,741—Sugaya. These prior art SMT-type polymer PTC devices comprise a layer of conductive polymeric material sandwiched between a pair of metal foil electrodes, with a terminal lead spot-welded or soldered to each electrode. Such devices have a number of drawbacks. For example, they do not readily lend themselves to state-of-the art automated manufacturing techniques, such as continuous processing, thereby increasing manufacturing costs. In many cases, the packaging design of the prior art devices is not suitable for several of the SMT component handling techniques, such as those mentioned above. Furthermore, the prior art devices with soldered terminal leads cannot be wave soldered to the underside of printed circuit boards, because the wave soldering process may loosen the terminal lead/electrode solder joint, resulting in a shifting of the terminal leads relative to the electrodes. To allow wave soldering, some prior art devices employ leads that are spot-welded to the electrodes, but this process is expensive, difficult to control, and conducive to creating localized areas of high resistance in the polymeric layer, which, in turn, cause performance degrading "hot spots" when the device is actuated or "tripped".

Nor can these prior art devices be easily glued to the underside of the board, since they typically lack insulative packages that can be adhesively attached to the board. Without underboard placement, these devices lose a significant advantage of SMT devices. For similar reasons, many prior art SMT-type polymer PCT devices either cannot be reflow soldered, or they can be reflow soldered only under carefully controlled conditions. Moreover, the prior art SMT-type polymer PTC devices have exposed electrodes and no insulative packaging to protect against short circuits or physical damage.

There has thus been a long-felt, but as yet unmet need for a process for manufacturing conductive polymer devices, particularly polymer PTC devices, that avoids the above-described disadvantages of the prior art batch process methods, while maintaining good uniformity of physical and electrical characteristics among devices with the same nominal specifications, and while keeping per unit manufacturing costs acceptably low.

There has also been a need for SMT-type conductive polymer devices, particularly polymer PTC devices, that can be readily manufactured using a continous process, and that are easily adaptable to state-of-the-art component handling equipment and methods. There is a still further need for devices of this nature that can also be soldered to the underside of a printed circuit board using conventional wave soldering techniques, and that can be reflow soldered with fewer limitations on the conditions imposed. Furthermore, it would be advantageous to provide devices that exhibit the aforementioned properties, while also being packaged so as to be protected against short circuits and physical shock.

SUMMARY OF THE INVENTION

Broadly, the present invention is a polymer PTC device, wherein a conductive polymeric layer is laminated between a pair of electrodes to which terminal leads are attached, and the laminated active element assembly is enclosed in a fluid-tight, insulative SMT-type package. Each of the electrodes may be formed integrally with its associated terminal lead in a single lead frame, with a layer of conductive polymer material laminated between two such lead frames. Alternatively, a conductive polymeric layer may be laminated between two electrodes, with a terminal lead then being soldered to each electrode. The insulative package for either of these active element assemblies may be either an over-molded housing encasing the laminated assembly, or a pre-molded housing, into which the laminated assembly is installed and hermetically sealed.

The active element assembly of the polymer PTC device of the present invention is preferably manufactured by a continuous process known as "direct extrusion". In direct extrusion, the steps of compounding the materials of the conductive polymer mixture, extruding the polymeric mixture, and laminating the extruded material are performed serially in a continuous process, with closed-loop process control by a microprocessor. A specific embodiment of this method employs a twin screw compounding extruder that compounds the polymeric mixture from materials received, in predetermined proportions, from gravimetric feeders, then extrudes a compounded conductive polymeric material in the melt phase. The extrudate is then fed into a gear pump that allows the extruder to discharge the compounded material, while it is still in the melt stage, at a relatively low pressure, thereby minimizing or avoiding the introduction of unnecessary shear forces and work into the material. The gear pump then produces a substantially constant volumetric output of the compounded "melt phase" material at sufficiently high pressure for delivery into a sheet die. The sheet die forms the compounded material, while still in the melt phase, into a high tolerance continuous web. The formed polymeric web, while at a temperature just below the melt temperature of the polymeric material, is fed into a mechanism that laminates a continuous web of conductive metal foil onto each side of the polymeric web, the foil webs being pre-heated to a temperature slightly above the melt temperature of the polymeric material. The continuous web of laminate may then be cut into measured lengths, prior to forming individual active elements. Alternatively, the laminated web may be wound into a roll prior to forming the individual active elements.

In the embodiments in which the electrodes are formed integrally with the terminal leads, each of the foil webs is in the form of a lead frame blank, wherein the foil web is provided with registration holes along each edge. After lamination, the laminated webs are cut and trimmed to form individual active element assemblies, each of which is attached to the lead frame by lead elements. While still attached to the lead frame, the individual active element assemblies may then be encapsulated in a conformal overmolded housing, or they may be placed in a pre-molded molded housing that is then hermetically sealed with a suitable potting material. Finally, the leads are separated from the lead frame and formed into a terminal lead shape that is suitable for an SMT-type device.

In the embodiments in which the terminal leads are separately attached to the electrodes, the laminated webs are cut into strips of suitable length. A first terminal lead frame carrying a first plurality of terminal leads is soldered to one side of the laminated strip, and a second terminal lead frame carrying a second plurality of terminal leads is soldered to the opposite side of the strip. The strip is then cut and trimmed to form individual active elements, each connected to the two lead frames. While still so connected, the active elements may be either encapsulated in a conformal overmolded housing or sealed into a pre-molded housing, as with the integral electrode/lead embodiments. Finally, the terminal leads are separated from the lead frame and formed into the desired shape.

In all embodiments, the housing provides protection from hostile chemical and physical environments, such as those encountered during wave soldering. Specifically, the housing provides protection of the active element and the lead/electrode connection from physical shock, while both isolating these components from the environment and electrically insulating these components to minimize the occurence of short circuits. Furthermore, the housing, being typically formed from a moldable thermoplastic material, is adhesively attachable to the material from which circuit boards are made, thus allowing the devices to be glued to the underside of the board. Moreover, the housing dissipates sufficient heat to allow the device to be attached to a circuit board by reflow or wave soldering, without substantial risk of damage to its internal components, and without adding heat histories to the polymeric element that can affect its stability of resistance. In addition, the heat dissipation provided by the housing allows the terminal leads to be soldered to the electrodes without significant risk of having the lead/electrode joint degraded or shifted when the device is soldered to the circuit board.

The continuous manufacturing process produces articles of manufacture, each comprising a formed polymeric layer sandwiched between metallic foil electrodes, suitable for fabrication into polymer PTC devices, that have undergone minimum heat history, and that have avoided the batch-to-batch variability in material thickness and resistivity inherent in the above-mentioned prior art batch processes. Furthermore, the polymer PTC devices manufactured from components produced by this method exhibit superior aging characteristics and voltage stability as compared with products made by the prior art processes.

In addition, the present invention provides SMT-type polymer PTC devices that exhibit the benefits and advantages of the SMT configuration, and that can be readily wave soldered or reflow soldered to circuit boards, and/or adhesively attached to circuit boards, without significant risk of damage or degradation in performance, thereby allowing these devices to be mounted on both sides of a circuit board. Furthermore, the devices constructed in accordance with the present invention can employ soldered connections between the leads and the electrodes, and yet still be reflow soldered or wave soldered. Moreover, the devices constructed in accordance with the present invention are provided with physical protection, electrical insulation, and environmental isolation. In addition, the devices constructed in accordance with the present invention are adapted for mass production in accordance with the continuous process disclosed herein.

These and other advantages of the invention will be more fully appreciated from the detailed description that follows.

DETAILED DESCRIPTION OF INVENTION

A. Continuous Process for Manufacturing the Active Element

Referring now to the drawings, a continuous process for the manufacturing of the active element of conductive polymer PTC devices, in accordance with the preferred embodiments of the invention, will be described in conjunction with a description of the apparatus used to carry out the process.

Figures 1, 2:
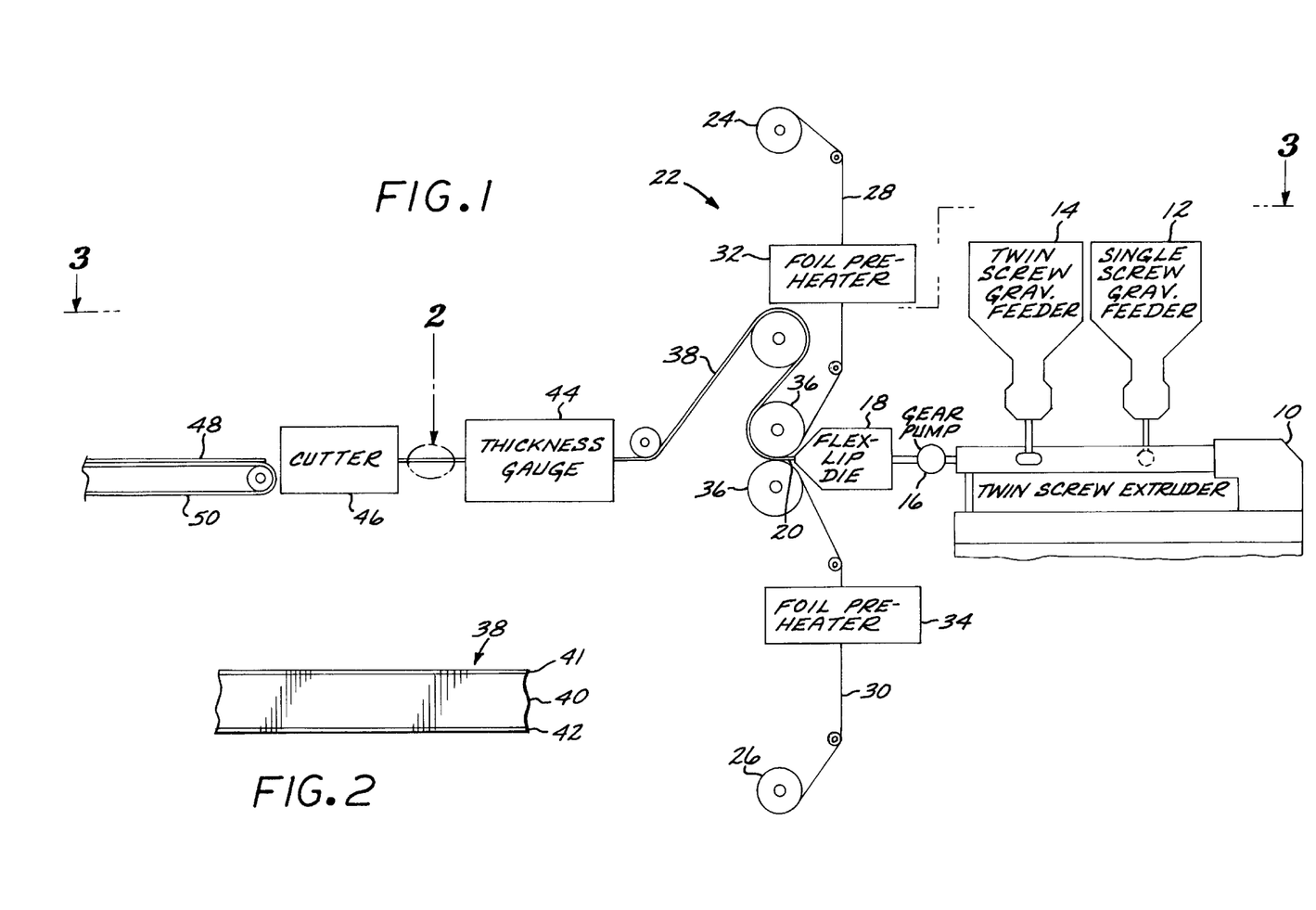
FIG. 1 is a semi-schematic, side elevational view of the apparatus used to carry out a continuous process for manufacturing a conductive polymer device, in accordance with a preferred embodiment of the present invention.
FIG. 2 is a detailed view of the laminated polymeric material produced by the apparatus of FIG. 1, as encompassed within the broken outline 2 in FIG. 1.
Figure 3:
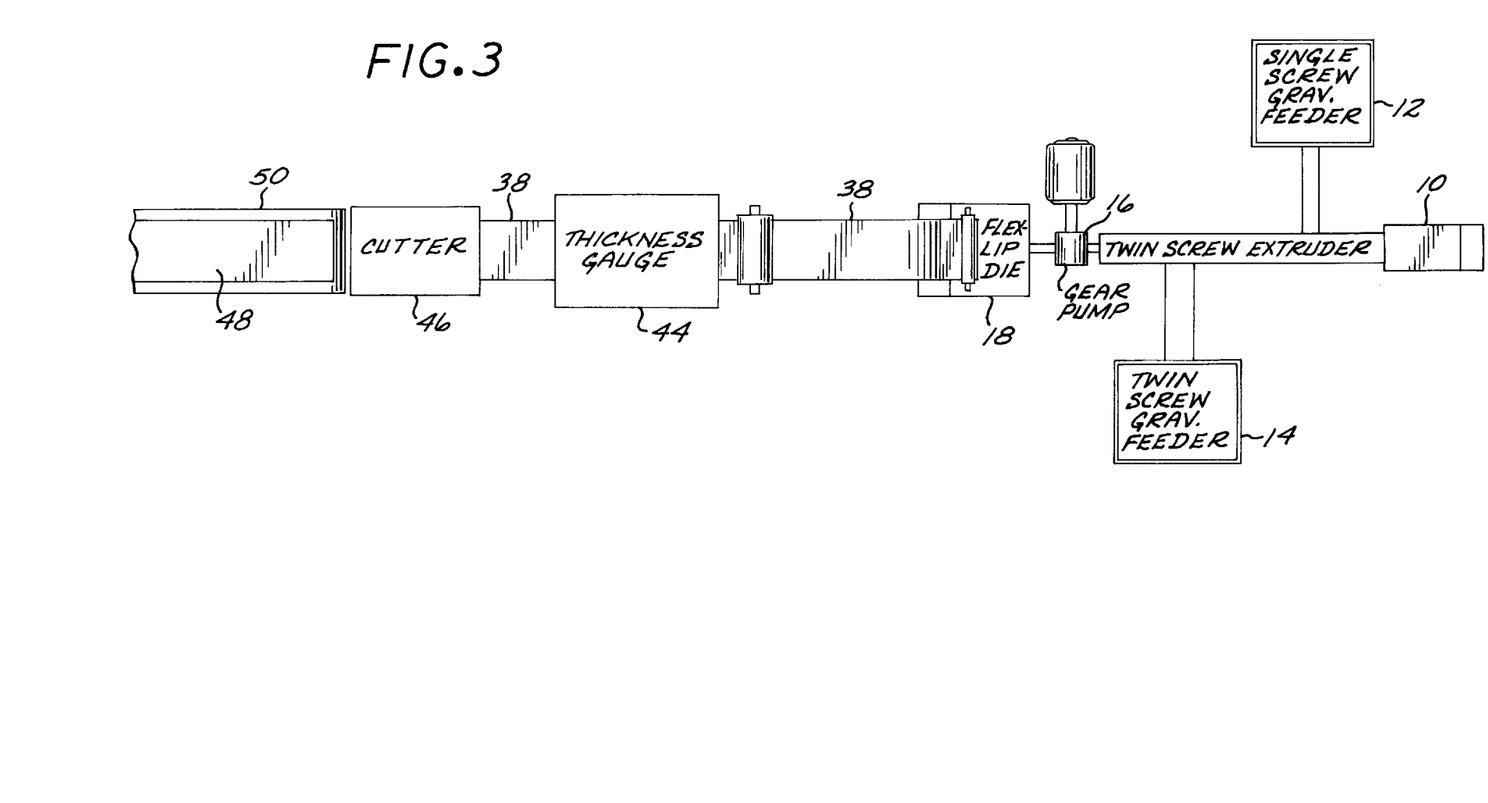
FIG. 3 is a top plan view of the apparatus of FIG. 1, taken along line 3—3 of FIG. 1.

The process begins with a compounding apparatus, comprising, in the preferred embodiment, a twin screw compounding extruder 10, such as the type available from American Leistritz Extruder Corporation, of Somerville, N.J., under the model designation "ZSE-27". The twin screw compounding extruder 10 includes dual extruder screws (not shown), selectively rotatable in co-rotation and counterrotation modes.

The materials from which the polymer PTC active element is compounded are fed into the compounding extruder 10, in predetermined proportions, and at predetermined feed rates, from a first gravimetric feeder 12 and a second gravimetric feeder 14, which may be of either the single screw or the twin screw type (depending on the materials employed), both types being conventional, commercially-available devices. In a preferred embodiment of the invention, a suitable polymer, such as high density polyethylene (HDPE) or polyvinylidene difluoride (PVDF), is fed, in commercially-available pelletized or powdered form, into the first (preferably single screw) feeder 12, while carbon black is fed into the second (preferably twin screw) feeder 14. The particular types of the constituent materials, and their proportions, depend upon the electrical and physical specifications of the devices to be manufactured, as exemplified by the compositions disclosed in the above-mentioned prior art references. Specific examples of other conductive polymer materials compounded from other polymers and conductive fillers, as well as other fillers, antioxidants, and cross-linking agents, are disclosed in U.S. Pat. No. 4,237,441—van Konynenburg et al., and U.S. Pat. No. 5,174,924—Yamada et al. The compounded conductive polymer formulations disclosed in these patents (as well as other formulations) may be readily employed in the subject invention, with a separate gravimetric feeder for each constituent material.

The action of the compounding extruder 10 melts the polymer pellets and thoroughly mixes and disperses the polymer material with the carbon black to produce a homogeneous compounded conductive polymer melt (preferably about 35% to 50% carbon black by volume, although a volumetric range of carbon black content of about 20% to 70% may be employed) that is discharged at relatively low pressure into the intake of a gear pump 16. The gear pump 16 is of the positive displacement type, specifically designed for polymer extrusion. A suitable gear pump 16 is the "ZENITH PEP-II" pump, of appropriate capacity (e.g., approximately 10 cc per revolution, in the preferred embodiments of the invention). The purpose of the gear pump 16 is to allow the extruder 10 to discharge the melted conductive polymer extrudate at relatively low pressure, thereby minimizing or avoiding the introduction of unnecessary shear forces and work into the material. The gear pump 16, in turn, generates a substantially constant volumetric flow of extrudate at sufficient pressure for input into a "flex-lip" sheet die 18.

The sheet die 18, which is also a conventional, commercially available apparatus, forms the compounded extrudate into a continuous sheet or web 20 of precisely-controlled thickness. When thus formed, the compounded polymer is still in the melt phase. In a preferred embodiment of the invention, the web 20 has a width of about 200 mm, and a thickness of between about 0.20 to about 1.0 mm, depending on the specifications of the component to be manufactured, with widths of up to about one meter and thicknesses of up to about 5 mm being achievable, if desired. The thickness is maintained within a tolerance of between about ±1% to about ±5% by a closed loop feed-back control system, as will be described below.

After exiting from the sheet die 18, the web 20 is fed into a lamination mechanism 22, having cooled to a temperature slightly below the melting point of the compounded polymer material. The lamination mechanism comprises a first foil feed reel or payoff reel 24 and a second foil feed reel or pay-off reel 26, which respectively contain first and second continuous sheets or webs 28, 30 of conductive metal foil (preferably nickel-plated copper, although solid copper, nickel, aluminum, and other metals may be used) having a thickness of about 0.025 mm, and having approximately the same width as the web 20 of compounded polymer. (The physical configuration of the foil webs 28, 30, as used in the preferred embodiments of the invention, will be more specifically described below.) As the foil webs 28, 30 are unwound from their respective pay-off reels 24, 26, they are respectively passed through first and second foil pre-heaters 32, 34. The pre-heaters 32, 34 respectively heat the foil webs 28, 30 to a temperature slightly above the melting point of the compounded polymer web 20. Preferably, the pre-heaters 32, 34 are of the hot air type, of conventional design.

After leaving the sheet die 18, the compounded polymer web 20 is passed between a pair of lamination rollers 36, which are heated to approximately the temperature of the compounded polymer web 20. After pre-heating, the foil webs 28, 30 are likewise passed between the lamination rollers 36, such that the first foil web 28 is laminated onto the top surface of the compounded polymer web 20, and the second foil web 30 is laminated onto the bottom surface of the compounded polymer web 20 by the pressure applied by the rollers 36. The result is a continuous three-layer web 38 (FIG. 2), with a compounded polymer layer 40 sandwiched between an upper foil layer 41 and a lower foil layer 42. The laminated web 38 may be passed through an optional thickness gauge 44, of any of several conventional designs, producing an output signal that is indicative of the web thickness, and that may be fed into a microprocessor used in the control of the process, as described below.

Figure 4:
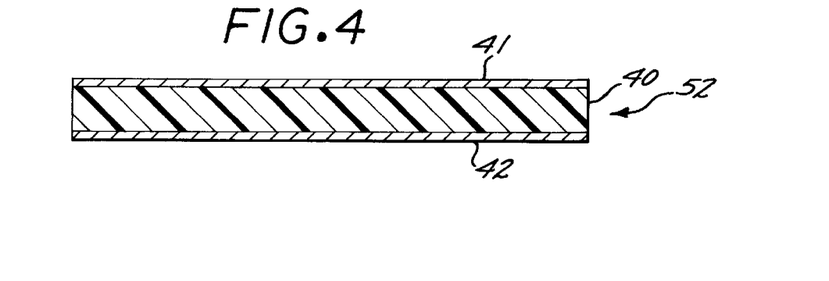
FIG. 4 is a cross-sectional view of a conductive polymer device constructed in accordance with the method of the present invention.

The laminated web 38 is exposed to the atmosphere for a short period of time, allowing it to cool to below the melting point of the compounded polymer. The cooled laminated web 38 may optionally be fed into a "guillotine"-type cutter mechanism 46, of conventional design, which cuts it into sheets 48 of measured length (e.g., about 300 to about 450 mm). The cutter mechanism 46 then discharges the cut sheets 48 onto a conveyor 50 for stacking, prior to the steps of forming and packaging the individual polymer PTC active elements, as will be described below. Alternatively, the continuous laminated web 38 may be re-wound into a roll (not shown), and then unwound for performing the steps of forming and packaging the individual active elements. A typical polymer PTC active element 52, manufactured in accordance with the above-described process, is shown in cross-section in FIG. 4.

Figure 5:
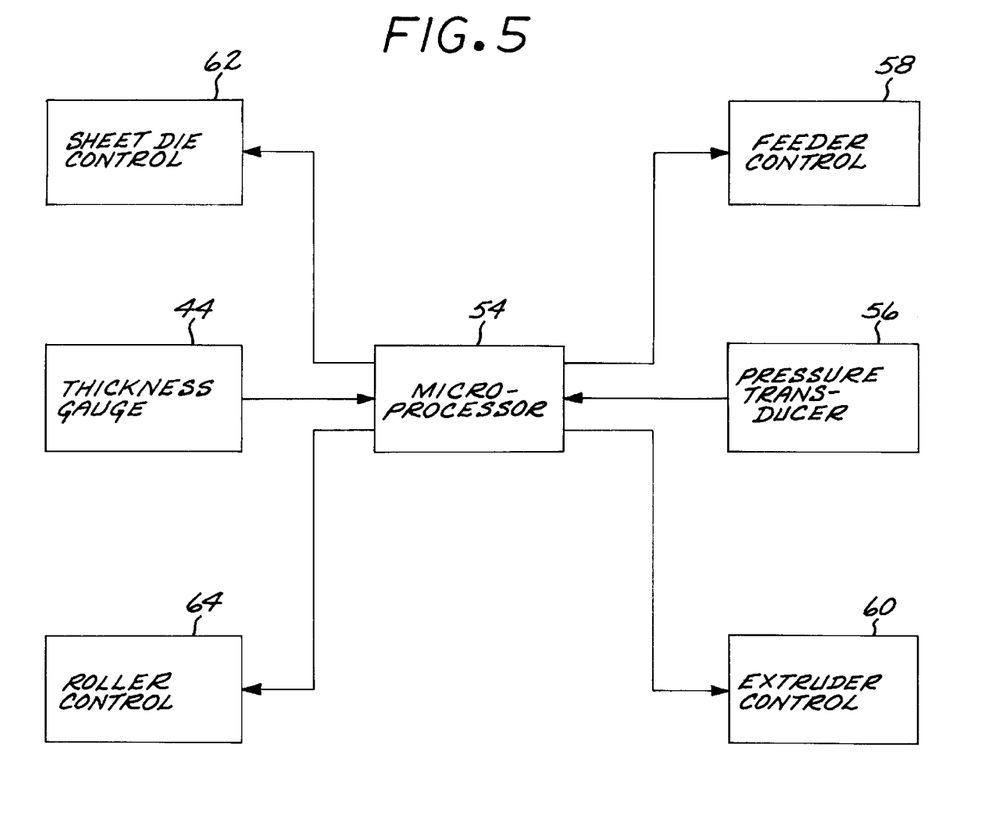
FIG. 5 is a schematic diagram of the control system used in the present invention.

As previously mentioned, the above-described manufacturing process is controlled by a closed loop feedback control system, under the control of a microprocessor 54, as shown in FIG. 5. The algorithm used by the microprocessor uses the inlet pressure of the gear pump 16 as the controlling parameter, with a predetermined inlet pressure as the set point. Thus, by means of a pressure transducer 56 at the pump inlet, the pump inlet pressure is measured, and a measured pressure signal is fed to the microprocessor 54. The microprocessor 54 then periodically compares the value of the measured pressure signal with a stored nominal or set point pressure value. The comparison yields a pressure difference signal that is fed to a feeder control mechanism 58 and an extruder control mechanism 60 respectively to control the feed rates of the gravimetric feeders 12, 14, and the rotation rate of the screws in the twin screw extruder 10 in such a manner as to minimize the absolute value of the pressure difference signal. (The feeder control mechanism 58 and the extruder control mechanism 60 are conventional electromechanical control mechanisms that well-known to those of ordinary skill in the pertinent arts.) The algorithm compensates for the residence time (typically about 30 to 180 seconds) of the compounded polymer within the extruder 10. Since the pump inlet pressure is a function of the feed rates and extruder screw rotation rate, the pump inlet pressure can be maintained at or very close to the set point pressure by controlling the feed rates and the extruder screw rotation rate. With these parameters thus controlled, consistency in the compounded polymer material can be maintained to within close tolerances.

If a thickness gauge 44 is used, as described above, another closed loop feedback system may be employed to maintain the thickness of the laminated web 38 to within close tolerances. The thickness control system employs a measured thickness signal generated by the thickness gauge 44 and fed to the microprocessor 54. The microprocessor contains an algorithm that compares the value of the measured thickness signal to a stored set point or nominal thickness value. This comparison yields a thickness difference signal that is fed to a sheet die control mechanism 62 to control the outlet gap of the sheet die 18. Also, the thickness difference signal may be fed to a roller control mechanism 64 to control the pressure applied by the lamination rollers 36 in laminating the foil webs 28, 30 to the compounded polymer web 20 (by controlling the gap width between the rollers 36), and/or the speed at which the rollers 36 draw the material down from the sheet die 18. At least one of these operational parameters (i.e., the sheet die outlet gap, the roller pressure, and/or the roller draw down speed) is controlled so as to minimize the absolute value of the thickness difference signal. (The sheet die control mechanism 62 and the roller control mechanism 64 are conventional electromechanical control mechanisms that well-known to those of ordinary skill in the pertinent arts.) The thickness of the laminated web 38 is thus a function of (a) the outlet gap width of the sheet die 18; (b) the pressure applied by the lamination rollers 36; and (c) the draw down speed of the rollers 36. Therefore, control of one or more of these parameters yields precise control of the thickness of the laminated web 38.

It will be appreciated from the foregoing description that the manufacturing process used in the present invention, by avoiding or minimizing the above-described shortcomings of batch processing methods, provides substantially improved uniformity, consistency, and predictability in the electrical and physical characteristics of the conductive polymer material, and, consequently, of the electrical devices formed from such material. Furthermore, these advantages are achieved while maintaining manufacturing costs acceptably low.

B. First and Second Preferred Embodiments of an SMT-Type Conductive Polymer Device FIGS. 6A through 13 illustrate the construction of first and second preferred embodiments of an SMT-type polymer PTC device, including a laminated conductive polymer active element made in accordance with the above-described process.

Figures 6A, 6B:
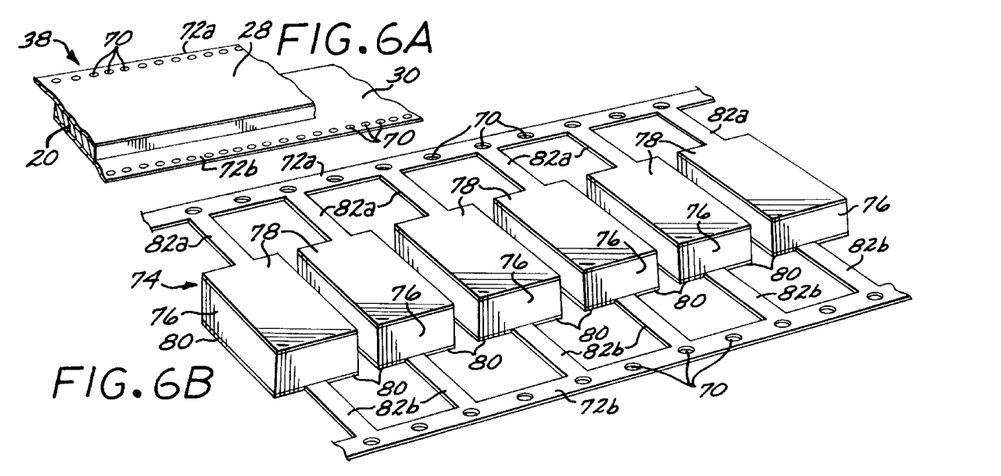
FIG. 6A is fragmentary perspective view of a laminated web comprising a pair of conductive metal lead frames with a conductive polymer web laminated between them, as employed in manufacturing laminated conductive polymer active elements in accordance with first and second preferred embodiments of the present invention.
FIG. 6B is a fragmentary perspective view, similar to that of FIG. 6A, showing the laminated web after it has been trimmed and cut to form a plurality of individual laminated conductive polymer active elements in accordance with the first and second preferred embodiments of the present invention.

FIG. 6A illustrates the above-mentioned metal foil webs 28, 30, configured as first and second (top and bottom) lead frame blanks, respectively. Each of the foil webs or lead frame blanks 28, 30 includes a row of evenly-spaced registration holes 70 along one edge. The lead frame blanks 28, 30 are oriented prior to the above-described lamination process so that after the polymeric web 20 is laminated between them, the laminated web 38 so formed includes an opposed parallel pair of carrier strips 72a, 72b, each of which includes a row of registration holes 70, as shown in FIG. 6A.

As shown in FIG. 6B, the laminated web 38 is then cut and trimmed (by conventional means, well-known in the art) to form a plurality of individual laminated conductive polymer active elements 74, each of which has a conductive polymer element 76 laminated between a first electrode 78 formed from the first lead frame blank 28 and a second electrode 80 formed from the second lead frame blank 30. Each of the first electrodes 78 is connected to one of the carrier strips 72a by one of a first plurality of integral lead elements 82a, while each of the second electrodes 80 is attached to the other carrier strip 72b by one of a second plurality of oppositely-directed integral lead elements 82b.

For the purposes of the present invention, it may be advantageous to treat the lead frame blanks 28, 30, by one of several methods known in the art, to provide an improved low resistivity bond with the polymeric web 20. For example, the surfaces of the lead frame blanks 28, 30 that will contact the polymeric web 20 may be "nodularized" by electrodeposition, as taught, for example, in U.S. Pat. Nos. 3,220,109 and 3,293,109, the disclosures of which are incorporated herein by reference.

Figure 7:
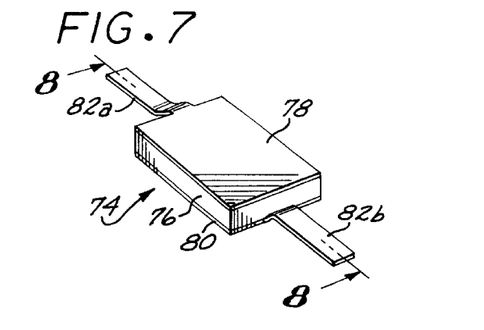
FIG. 7 is a perspective view of a laminated conductive polymer active element, as employed in the first and second preferred embodiments of the present invention, prior to its being packaged in a housing.
Figure 8:
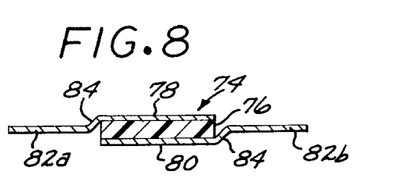
FIG. 8 is a cross-sectional view taken along line 8—8 of FIG. 7.

FIGS. 7 and 8 illustrate an individual laminated conductive polymer active element 74, shown prior to being packaged in a housing, as will be described below. As shown in FIGS. 7 and 8, the active element 74 is separated from the carrier strips 72a, 72b, and the packaging procedure may be performed after such separation. It is more efficient, however, to package the active elements 74 while they are still attached to the carrier strips 72a, 72b, as shown in FIG. 6B. As also shown in FIGS. 7 and 8, the lead elements 82a, 82b may advantageously be formed into a downward S-bend 84 near their respective junctures with the electrodes 78, 80. The S-bends 84, which are preferably formed while the carrier strips 72a, 72b are still attached, provide improved adhesion of the housing material, as will be described below.

Figure 9:
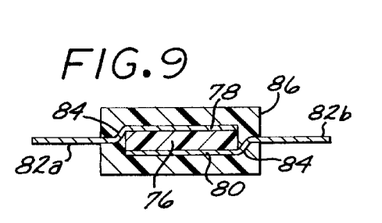
FIG. 9 is a cross-sectional view, similar to that of FIG. 8, showing the laminated active element of FIG. 7 encapsulated in a conforming over-molded housing, in accordance with the first preferred embodiment of the invention.
Figures 12, 13, 14A, 14B, 15, 16, 17:
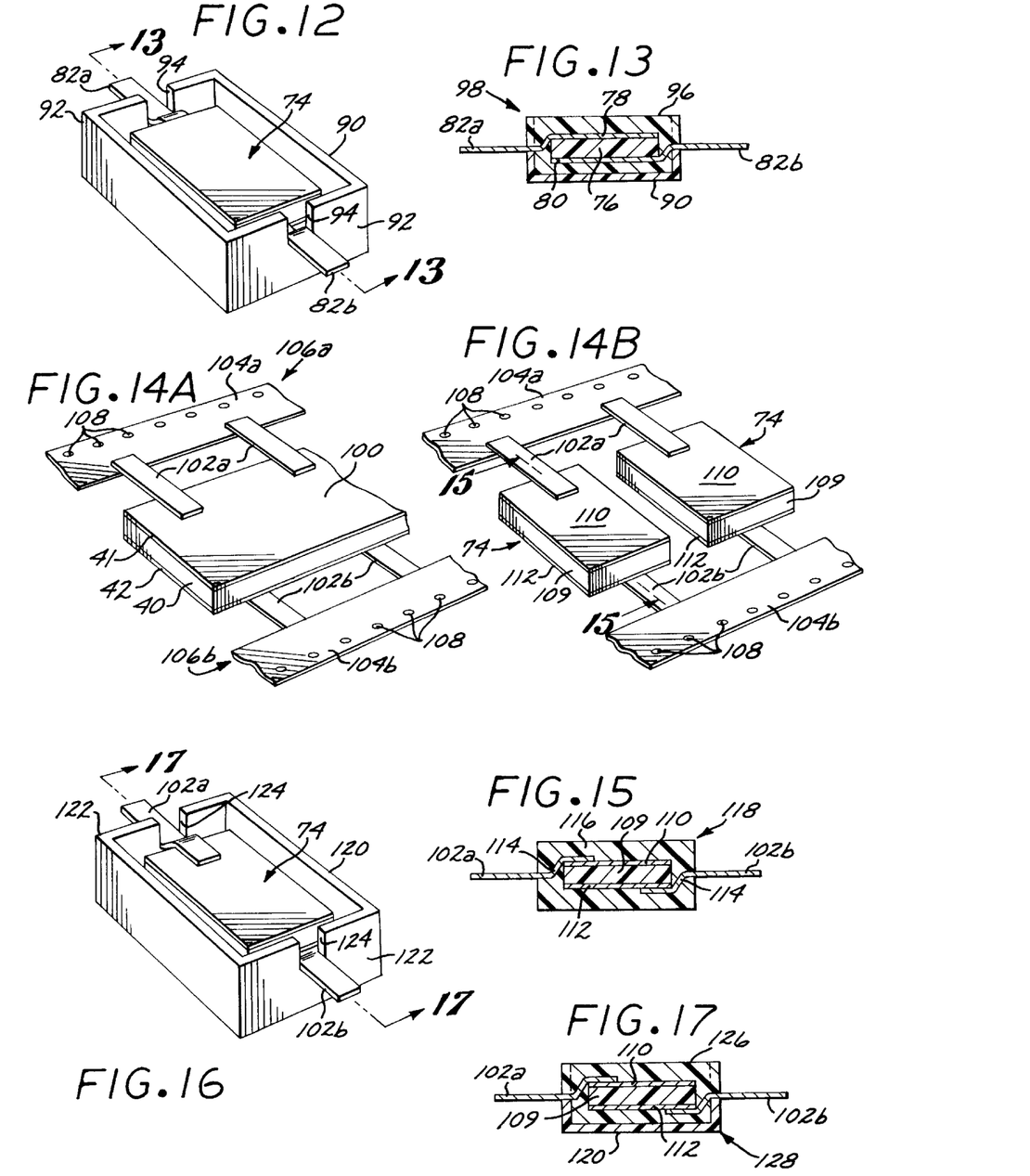
FIG. 12 is a perspective view showing the laminated active element of FIG. 7 installed in a pre-molded housing, in accordance with the second preferred embodiment of the invention, prior to hermetic sealing.
FIG. 13 is a cross-sectional view taken along line 13—13 of FIG. 12, but after the housing is hermetically sealed.
FIG. 14A is a perspective view of a strip of the laminated web from which the active elements of the present invention are made, showing the strip attached to a lead frame as a step in the construction of third and fourth preferred embodiments of the present invention.
FIG. 14B is a perspective view of a laminated polymer PTC active element, as employed in the third and fourth preferred embodiments of the present invention, showing the active element attached to a lead frame.
FIG. 15 is a cross-sectional view taken along line 15—15 of FIG. 14B, but showing the laminated active element encapsulated in a conformal over-molded housing, in accordance with the third preferred embodiment of the invention.
FIG. 16 is a perspective view of the laminated active element of FIG. 14 installed in a pre-molded housing, in accordance with the fourth preferred embodiment of the invention, prior to hermetic sealing.
FIG. 17 is a cross-sectional view taken along lin 17—17 of FIG. 16, but after the housing is hermetically sealed.

In accordance with the present invention, there are two preferred methods of packaging the active elements 74. In the first method, the lead frame (the active elements 74 attached to the carrier strips 72a, 72b) is passed through a molding machine (not shown), of a type well-known in the art, with the registration holes 70 providing proper location of the active elements 74 during the molding process. The active elements 74 are over-molded with a suitable thermoplastic to form an over-molded conformal housing 86 in which the active elements 74 are hermetically encapsulated, as shown in FIG. 9, thereby forming a packaged conductive polymer device 88 in accordance with a first preferred embodiment of the invention. The encapsulation material of the conformal housing 86 should have a coefficient of thermal expansion that is as close to that of the polymeric layer 40 as possible. The packaged devices 88 are then cut from the carrier strips 72a, 72b, and the leads 82a, 82b are trimmed and bent into the SMT configuration shown in FIGS. 10 and Alternatively, the active elements 74 can be packaged in a pre-molded housing 90, as shown in FIGS. 12 and 13. In this variation, housings 90 are pre-molded with an internal cavity 91, one open side, and two opposed ends 92, each provided with a slot 94. The cavities 91 are sized large enough to receive an active element 74 through the one open side. Thus, each of the active elements 74, while still attached to the carrier strips 72a, 72b, and after formation of the S-bends 84 in the lead elements 82a, 82b, is placed inside one of the pre-molded housings 90, with the lead elements 82a, 82b received in the slots 94, as shown in FIG. 12. This installation process can easily be automated, with the active elements 74 properly located with respect to the housings 90 by means of the registration holes 70.

After the active elements 74 are installed in the housing cavities 91, cavity 91 is filled with a potting material 96, preferably an epoxy resin or silicone-rubber compound, of any suitable type well-known in the art. Preferably, the selected potting material 96 has a coefficient of thermal expansion that is as close as possible to that of the polymeric layer 40 of the active element 74. The result, shown in FIG. 13, is a packaged conductive polymer PTC device 98, in accordance with a second preferred embodiment of the invention, in which the open side of the housing 90 is hermetically sealed by the potting material 96, which also fills the cavity 91 around the active element 74 and the junctures between the lead elements 82a, 82b and the electrodes 78, 80, respectively.

Figure 10:
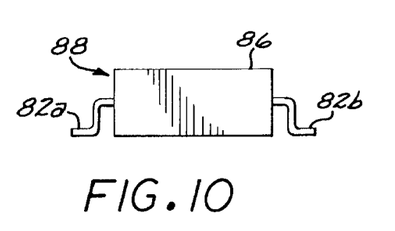
FIG. 10 is an end elevational view of the device of FIG. 9, showing the terminal leads formed into an SMT configuration.
Figure 11:
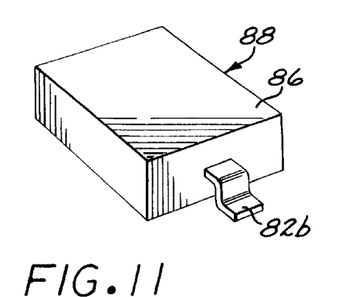
FIG. 11 is a perspective view of the device of FIG. 10.

Finally, as with the previously-described embodiment, the lead elements 82a, 82b, after being cut from the carrier strips 72a, 72b, are formed into the SMT configuration shown in FIGS. 10 and 11.

C. Third and Fourth Preferred Embodiments of an SMT-Type Conductive Polymer Device FIGS. 14 through 17 illustrate the construction of third and fourth preferred embodiments of an SMT-type polymer PTC device, including a laminated conductive polymer active element made in accordance with the above-described process.

In constructing the third and fourth embodiments, the laminated web 38 is first cut into a strip 100 of desired length. The laminated strip 100 comprises a conductive polymer layer 40 sandwiched between an upper foil layer 41 and a lower foil layer 42, as previously described with reference to FIG. 2. First and second pluralities of discrete lead elements 102a, 102b, selected from the appropriate material (preferably nickel, copper, or beryllium-copper) and cut to the correct size, are respectively attached to first and second carrier strips 104a, 104b to form first and second lead frames 106a, 106b. The carrier strips 104a, 104b are provided with registration holes 108.

Next, the laminated strip 100 is attached to the first and second lead frames 106a, 106b by soldering the first plurality of lead elements 102a to the upper foil layer 41 and the second plurality of lead elements 102b to the lower foil layer 42, as shown in FIG. 14A. The laminated strip 100 is then cut to separate it into individual active elements 74, as shown in FIG. 14B, each with a conductive polymer layer 109 sandwiched between an upper electrode 110 formed from the upper foil layer 41, and a lower electrode 112 formed from the lower foil layer 42. The upper electrode 110 is still attached to the first carrier strip 104a by one of the first plurality of lead elements 102a, and the lower electrode 112 is still attached to the second carrier strip 104b by one of the second plurality of lead elements 102b.

Alternatively, the laminated strip 100 can be precut into into a plurality of laminated chips dimensioned as individual active elements 74, each with an upper electrode 110 and and a lower electrode 112. These laminated chips are then attached to the first and second lead frames 106a, 106b by soldering one of the first plurality of lead elements 102a to each of the upper electrodes 110, and one of the second plurality of lead elements 102b to each of the lower electrodes 112. Thus, in this alternate method, the step illustrated in FIG. 14A is not performed, and the cutting of the individual active elements is performed before they are soldered to the lead frame.

In either case, after the active elements 74 are formed and while they are still attached to the lead frames 106a, 106b, a downward S-bend 114 is formed in each of the lead elements 102a, 102b near its juncture with its associated electrode 110 or 112.

Either of the two packaging methods described above with respect to the first and second embodiments can be used to package the active elements 74 of the third and fourth embodiments of the invention. In the first method, the lead frames 106a, 106b, with the active elements 74 attached to it, is passed through a molding machine (not shown), of a type well-known in the art, with the registration holes 108 in the carrier strips 104a, 104b providing proper location of the active elements 74 during the molding process. The active elements 74 are over-molded with a suitable thermoplastic to form an over-molded conformal housing 116, in which the active elements 74 are hermetically encapsulated, as shown in FIG. 15, thereby forming a packaged conductive polymer device 118 in accordance with a third preferred embodiment of the invention. The encapsulation material of the conformal housing 116 should have a coefficient of thermal expansion that is as close to that of the polymeric layer 40 as possible. The packaged devices 118 are then cut from the carrier strips 104a, 104b, and the leads 102a, 102b are trimmed and bent into the SMT configuration shown in FIGS. 10 and 11.

Alternatively, the active elements 74 can be packaged in a pre-molded housing 120, as shown in FIGS. 16 and 17. In this variation, housings 120 are pre-molded with an internal cavity 121, one open side, and two opposed ends 122, each provided with a slot 124. The cavities 121 are sized large enough to receive an active element 74 through the one open side. Thus, each of the active elements 74, while still attached to the lead frames 106a, 106b, and after formation of the S-bends 114 in the lead elements 102a, 102b, is placed inside one of the pre-molded housings 120, with the lead elements 102a, 102b received in the slots 124, as shown in FIG. 16. This installation process can easily be automated, with the active elements 74 properly located with respect to the housings 120 by means of the registration holes 108.

After the active elements 74 are installed in the cavities 121, each housing 120 is filled with a potting material 126, preferably an epoxy resin or silicone-rubber compound, of any suitable type well-known in the art. Preferably, the selected potting material 126 has a coefficient of thermal expansion that is as close as possible to that of the polymeric layer 40 of the active element 74. The result, shown in FIG. 17, is a packaged conductive polymer PTC device 128, in accordance with a fourth preferred embodiment of the invention, in which the open side of the housing 120 is hermetically sealed by the potting material 126, which also fills the cavity 121 around the active element 74 and the junctures between the lead elements 102a, 102b and the upper and lower electrodes 110, 112, respectively.

Finally, as with the previously-described embodiments, the lead elements 102a, 102b, after being cut from the carrier strips 104a, 104b, are formed into the SMT configuration shown in FIGS. 10 and 11.

While several preferred embodiments of the present invention have been described herein, it will be appreciated that a number of modifications and variations, some of which have been mentioned above, will suggest themselves to those skilled in the pertinent arts. These and other modifications and variations that may suggest themselves are considered to be within the spirit and scope of the present invention, as defined in the claims that follow.

What is claimed is:

1. A method of making an electronic device, comprising the steps of:
    providing a first length of conductive metal foil having a peripheral edge formed as a first carrier strip;
    providing a second length of conductive metal foil having a peripheral edge formed as a second carrier strip;
    laminating a layer of conductive polymeric material between the first and second lengths of conductive metal foil to form a laminated strip having the first and second carrier strips along opposed edges;
    forming the laminated strip into a plurality of active elements, each comprising a layer of conductive polymer material sandwiched between a first planar metal foil electrode connected to the first carrier strip by a first terminal lead element and a second planar metal foil electrode connected to the second carrier strip by a second terminal lead element;
    enclosing each of the active elements in an insulative package; and
    separating the first and second terminal lead elements from the first and second carrier strips, respectively.

2. The method of claim 1, wherein the enclosing step comprises the step of overmolding a conformal housing around each of the active elements.

3. The method of claim 1, wherein the enclosing step comprises the steps of:
    for each of the active elements, providing a pre-molded housing having a cavity;
    inserting an active element into the cavity of each of the pre-molded housings; and
    hermetically sealing each cavity with sealing material placed in the cavity around the active element.

4. A method of making an electronic device, comprising the steps of:
    providing a laminated strip comprising a conductive polymer layer sandwiched between first and second metal layers;
    providing a first lead frame comprising a first plurality of lead members connected to a first carrier strip;
    providing a second lead frame comprising a second plurality of lead members connected to a second carrier strip;
    attaching the first plurality of lead members to the first metal layer;
    attaching the second plurality of lead members to the second metal layer;
    forming the laminated strip into a plurality of active elements, each comprising a conductive polymer layer sandwiched between a first electrode formed from the first metal layer and a second electrode formed from the second metal layer, the first electrode being attached to the first carrier strip by one of the first plurality of lead elements and the second electrode being attached to the second carrier strip by one of the second plurality of lead elements;
    enclosing each of the active elements in an insulative package; and
    separating the first and second lead elements from the first and second carrier strips, respectively.

5. The method of claim 4, wherein the enclosing step comprises the step of overmolding a conformal housing around each of the active elements.

6. The method of claim 4, wherein the enclosing step comprises the steps of:
    for each of the active elements, providing a pre-molded housing having a cavity;
    inserting an active element into the cavity of each of the pre-molded housings; and
    hermetically sealing each cavity with sealing material placed in the cavity around the active element.

7. The method of claim 4, wherein the attaching steps are performed by soldering.

8. The method of claim 5, wherein the attaching steps are performed by soldering.

9. The method of claim 6, wherein the attaching steps are performed by soldering.

10. A method of making an electronic device, comprising the steps of:
    providing a laminated strip comprising a conductive polymer layer sandwiched between first and second metal layers;
    forming the laminated strip into a plurality of active elements, each comprising a conductive polymer layer sandwiched between a first electrode formed from the first metal layer and a second electrode formed from the second metal layer, the first electrode being attached to the first carrier strip by one of the first plurality of lead elements and the second electrode being attached to the second carrier strip by one of the second plurality of lead elements;
    providing a first lead frame comprising a first plurality of lead members connected to a first carrier strip;
    providing a second lead frame comprising a second plurality of lead members connected to a second carrier strip;
    attaching each of the first plurality of lead members to the first electrode of one of the active elements;
    attaching each of the second plurality of lead members to the second electrode of one of the active elements;
    enclosing each of the active elements in an insulative package; and
    separating the first and second lead elements from the first and second carrier strips, respectively.

11. The method of claim 10, wherein the enclosing step comprises the step of overmolding a conformal housing around each of the active elements.

12. The method of claim 10, wherein the enclosing step comprises the steps of:
- for each of the active elements, providing a premolded housing having a cavity;
- inserting an active element into the cavity of each of the pre-molded housings; and
- hermetically sealing each cavity with sealing material placed in the cavity around the active element.

13. The method of claim 10, wherein the attaching steps are performed by soldering.

14. The method of claim 11, wherein the attaching steps are performed by soldering.

15. The method of claim 12, wherein the attaching steps are performed by soldering.

* * * * *